US012155992B2

(12) United States Patent
Ren et al.

(10) Patent No.: US 12,155,992 B2
(45) Date of Patent: Nov. 26, 2024

(54) COAXIAL SPEAKER

(71) Applicant: AAC Microtech (Changzhou) Co., Ltd., Changzhou (CN)

(72) Inventors: Zhang Ren, Shenzhen (CN); Qi Wang, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 209 days.

(21) Appl. No.: 18/089,581

(22) Filed: Dec. 28, 2022

(65) Prior Publication Data

US 2024/0073585 A1 Feb. 29, 2024

Related U.S. Application Data

(63) Continuation of application No. PCT/CN2022/125116, filed on Oct. 13, 2022.

(30) Foreign Application Priority Data

Aug. 30, 2022 (CN) ......................... 202222292963.6

(51) Int. Cl.

| | |
|---|---|
| ***H04R 9/06*** | (2006.01) |
| ***H04R 1/24*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ................. *H04R 1/24* (2013.01); *H04R 7/04* (2013.01); *H04R 7/18* (2013.01); *H04R 9/025* (2013.01); *H04R 9/046* (2013.01); *H04R 9/06* (2013.01); *H04R 2400/11* (2013.01)

(58) Field of Classification Search

CPC ... H04R 1/06; H04R 1/24; H04R 7/04; H04R 7/18; H04R 9/025; H04R 9/046; H04R 9/06; H04R 2400/11

See application file for complete search history.

(56) References Cited

U.S. PATENT DOCUMENTS

2002/0168074 A1* 11/2002 Miyamoto ............... H04R 9/10 381/182
2013/0195293 A1* 8/2013 Ko ......................... H04R 19/02 381/191
2015/0139479 A1* 5/2015 Lai ......................... H04R 9/025 381/412
2024/0073616 A1* 2/2024 Ren .......................... H04R 7/18

* cited by examiner

*Primary Examiner* — Huyen D Le
(74) *Attorney, Agent, or Firm* — W&G Law Group

(57) ABSTRACT

Disclosed is a coaxial speaker, including a magnetic circuit system, and two sounding units respectively arranged on the upper and lower sides of the magnetic circuit system. The magnetic circuit system includes a bottom plate, a first magnetic unit including a first magnet and a first yoke, and a second magnetic unit including a second magnet, a second yoke, a third magnet, and a fourth magnet. The second yoke includes an annular plate sandwiched between the second and third magnets, and a hollow protrusion extending to a first through hole of the bottom plate. The third magnet covers a second through hole of the annular plate. The fourth magnet is fixed to the third magnet and contained inside the hollow protrusion. The coaxial speaker is simple and compact in structure, reduces the cost, and can also be used as a receiver with a reverse phase silencer.

10 Claims, 3 Drawing Sheets

A-A

COAXIAL SPEAKER

FIELD OF THE PRESENT DISCLOSURE

The present disclosure relates to electroacoustic transducers, in particular to a coaxial speaker.

DESCRIPTION OF THE RELATED ART

A coaxial speaker is a speaker with both a high-frequency sounding unit and a low-frequency sounding unit, and the high-frequency sounding unit and the low-frequency sounding unit are coaxially arranged. The high-frequency sounding unit and the low-frequency sounding unit of the coaxial speaker can be located together on the front side of the coaxial speaker, or can be respectively located on the front and back sides of the coaxial speaker.

A coaxial speaker in the related art, each of the high-frequency sounding unit and the low-frequency sounding unit has an individual and separate magnetic circuit system, resulting in leading to many problems such as a complex overall structure, an excessive stacking height, and a high cost of magnetic circuit systems.

Thus, it is necessary to provide a novel coaxial speaker to solve the problem.

SUMMARY

An objective of the present disclosure is to overcome the above technical problems and provide a coaxial speaker with a common magnetic circuit system. The coaxial speaker is simple and compact in structure, reduces the cost, and can also be used as a receiver with a reverse phase silencer.

In order to achieve the objective mentioned above, the present disclosure discloses a coaxial speaker including a magnetic circuit system, a first sounding unit arranged on an upper side of the magnetic circuit system, and a second sounding unit arranged on a lower side of the magnetic circuit system and coaxially with the first sounding unit. The first sounding unit includes a first diaphragm and a first voice coil driving the first diaphragm for vibrating and emitting sounds. The second sounding unit includes a second diaphragm and a second voice coil driving the second diaphragm for vibrating and emitting sounds. The magnetic circuit system includes a bottom plate, and a first magnetic unit and a second magnetic unit fixed to the bottom plate. The first magnetic unit is arranged on an outer side of the second magnetic unit and spaced apart from the second magnetic unit for forming a first magnetic gap. The first voice coil locates in the first magnetic gap. The first magnetic unit includes a first magnet fixed to the bottom plate and a first yoke fixed to the first magnet. The bottom plate is provided with a first through hole. The second magnetic unit includes a second magnet in an annular shape fixed to the bottom plate and surrounding the first through hole, a second yoke fixed to the second magnet, a third magnet fixed to the second yoke, and a fourth magnet fixed to the third magnet and contained inside the second yoke. The second yoke includes an annular plate provided with a second through hole and sandwiched between the second magnet and the third magnet, and a hollow protrusion extending from an inner edge of the annular plate in a direction away from the third magnet. The hollow protrusion extends through the second magnet to the first through hole. The hollow protrusion includes a bottom wall and a side wall connecting the bottom wall and the annular plate. A second magnetic gap is formed by the hollow protrusion together with the bottom plate and the second magnet. The second voice coil locates in the second magnetic gap. The third magnet covers the second through hole. The fourth magnet is fixed to a lower surface of the third magnet and contained inside the hollow protrusion.

As an improvement, the third magnet and the fourth magnet are integrated into one piece.

As an improvement, a lower surface of the bottom wall is flush with that of the bottom plate.

As an improvement, the coaxial speaker further includes a first frame and a second frame. The first frame is fixed to the first yoke. The second frame is fixed to a lower surface of the bottom plate. An outer fixing part of the first diaphragm is fixed to the first frame, an inner fixing part of the first diaphragm is fixed to the third magnet. The second diaphragm is fixed to the second frame.

As an improvement, the first sounding unit further includes an elastic supporting member opposite to and spaced apart from the first diaphragm, and a skeleton connected between the first diaphragm and the elastic supporting member. An amount of the elastic supporting members is two, the two elastic supporting members are respectively arranged on two opposite short-axis sides of the coaxial speaker. The skeleton includes two supporting arms respectively fixed to the two elastic supporting members. Each supporting arm is arranged between the first frame and the first magnetic unit. An outer fixing portion of each elastic supporting member is fixed to the first frame, an inner fixing portion of each elastic supporting member is fixed to a corresponding one of the two supporting arms.

As an improvement, each elastic supporting member includes a first flexible printed circuit board fixed to a corresponding one of the two supporting arms and an auxiliary diaphragm fixed to a lower surface of the first flexible printed circuit board.

As an improvement, the second sounding unit further includes a second flexible printed circuit board fixed to a surface of the second diaphragm close to the magnetic circuit system. The second flexible printed circuit board includes a peripheral part sandwiched between the second diaphragm and the second frame, and an extension part extending from the peripheral part toward the first diaphragm. An end of the extension part is fixed to a lower surface of the first yoke.

As an improvement, the bottom plate and the first magnet are provided with a depressed region for avoiding the extension part. The extension part extends along sides of the second frame, the bottom plate and the first magnet.

As an improvement, the second frame is provided with a leakage path.

As an improvement, the coaxial speaker further includes a bottom cover. The bottom cover covers the second diaphragm and is provided with a sound hole for the second sounding unit.

In the coaxial speaker according to the present disclosure, the first magnetic unit and the second magnetic unit are spaced apart for forming the first magnetic gap for the first sounding unit, the second magnetic unit forms the second magnetic gap for the second sounding unit through the hollow protrusion of its second yoke, the first sounding unit and the second sounding unit have the common magnetic circuit system, thereby the coaxial speaker is simple and compact in structure and reduces the cost. In addition, besides the first sounding unit emits low-frequency sounds and the second sounding unit emits high-frequency sounds for providing high quality full-frequency sounds, the second sounding unit can also be used as a receiver, and the first sounding unit serves as a reverse phase silencer when the receiver works.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
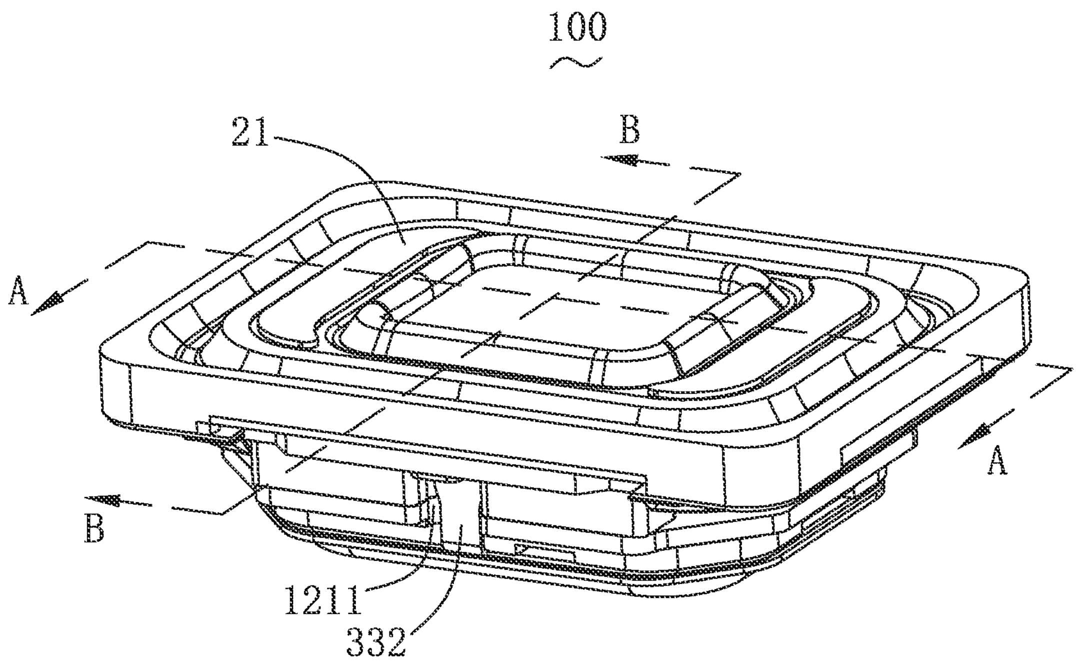
FIG. 1 is an isometric view of a coaxial speaker in accordance with an exemplary embodiment of the present disclosure.
Figure 2:
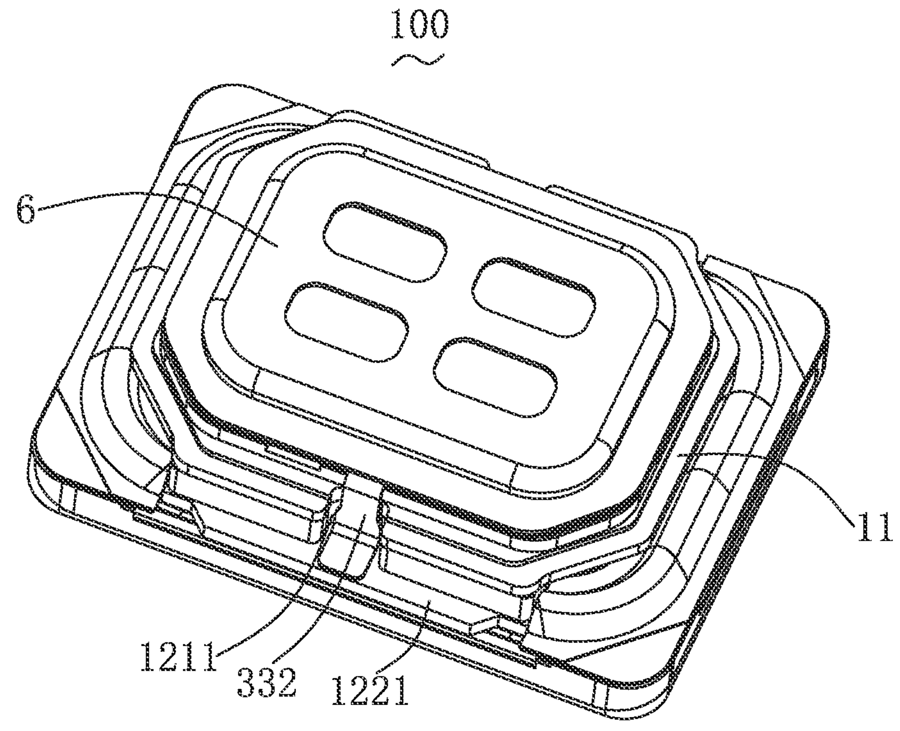
FIG. 2 is another isometric view of the coaxial speaker in FIG. 1, from another aspect.
Figure 3:
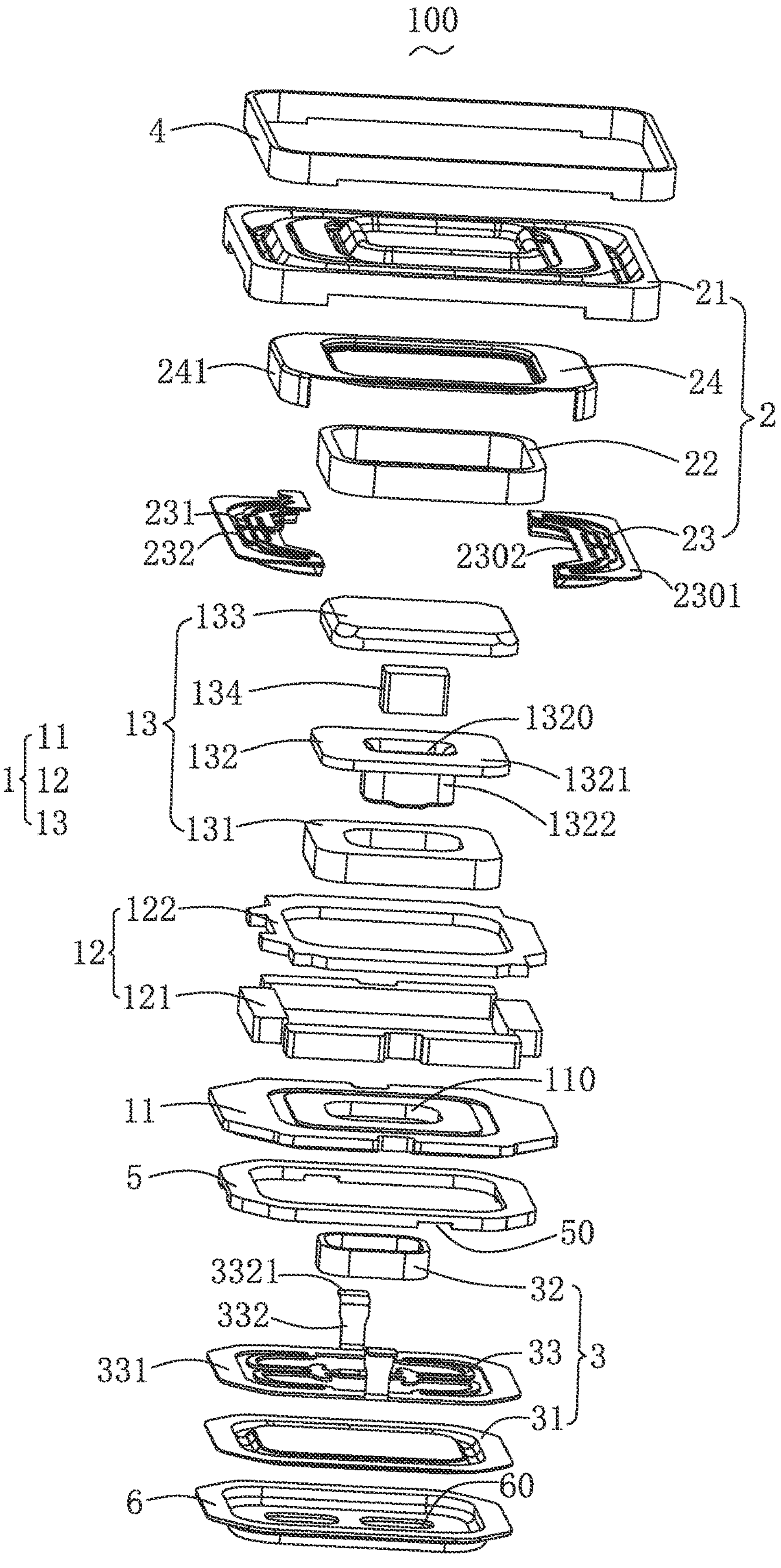
FIG. 3 is an exploded view of the coaxial speaker in FIG. 1.
Figure 4:
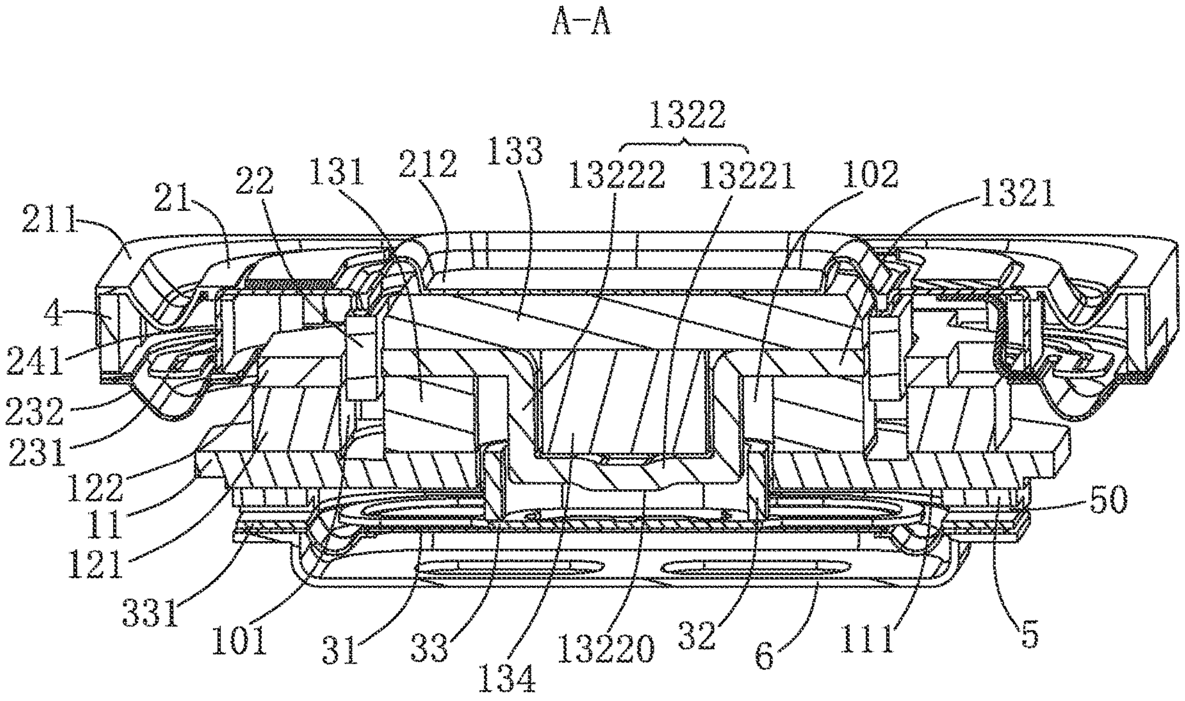
FIG. 4 is a cross-sectional view of the coaxial speaker, taken along line A-A in FIG. 1.
Figure 5:
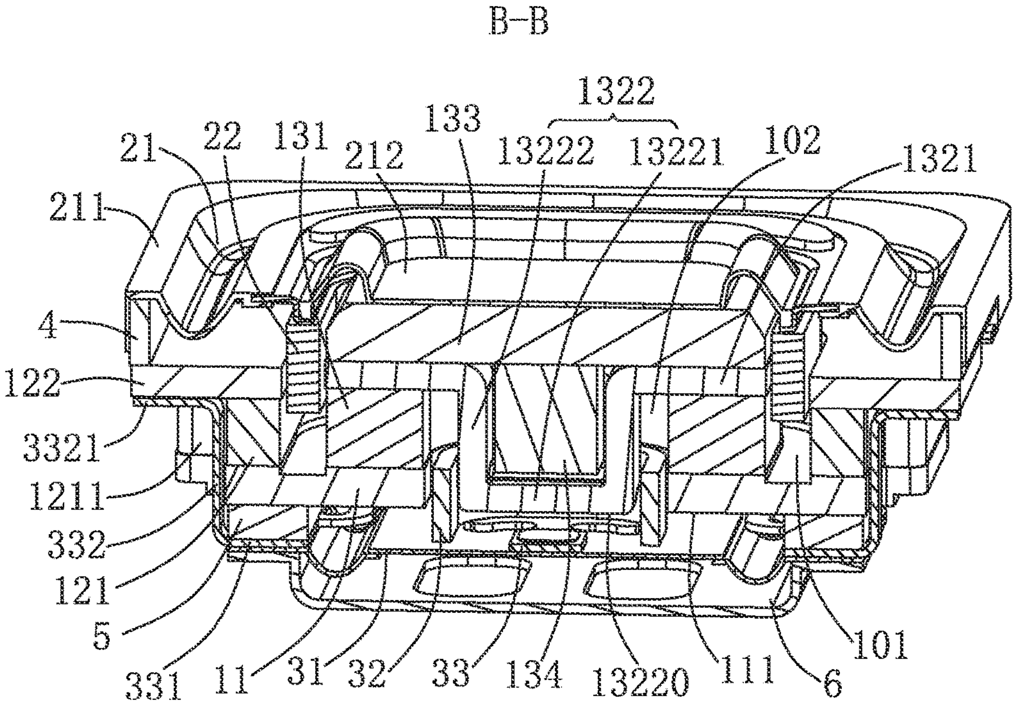
FIG. 5 is a cross-sectional view of the coaxial speaker, taken along line B-B in FIG. 1.

Referring to FIGS. 1-5, the present disclosure discloses a coaxial speaker 100 including a magnetic circuit system 1, a first sounding unit 2 arranged on an upper side of the magnetic circuit system 1, and a second sounding unit 3 arranged on a lower side of the magnetic circuit system 1 and coaxially with the first sounding unit 2.

The first sounding unit 2 includes a first diaphragm 21 and a first voice coil 22 driving the first diaphragm 21 for vibrating and emitting sounds. The second sounding unit 3 includes a second diaphragm 31 and a second voice coil 32 driving the second diaphragm 31 for vibrating and emitting sounds.

The magnetic circuit system 1 includes a bottom plate 11, and a first magnetic unit 12 and a second magnetic unit 13 fixed to the bottom plate 11. The first magnetic unit 12 is arranged on an outer side of the second magnetic unit 13 and spaced apart from the second magnetic unit 13 for forming a first magnetic gap 101. The first voice coil 22 locates in the first magnetic gap 101. The first magnetic unit 12 includes a first magnet 121 fixed to the bottom plate 11 and a first yoke 122 fixed to the first magnet 121. The bottom plate 11 is provided with a first through hole 110. The second magnetic unit 13 includes a second magnet 131 in an annular shape fixed to the bottom plate 11 and surrounding the first through hole 110, a second yoke 132 fixed to the second magnet 131, a third magnet 133 fixed to the second yoke 132, and a fourth magnet 134 fixed to the third magnet 133 and contained inside the second yoke 132. The second yoke 132 includes an annular plate 1321 provided with a second through hole 1320 and sandwiched between the second magnet 131 and the third magnet 133, and a hollow protrusion 1322 extending from an inner edge of the annular plate 1321 in a direction away from the third magnet 133. The hollow protrusion 1322 extends through the second magnet 131 to the first through hole 110. The hollow protrusion 1322 includes a bottom wall 13221 and a side wall 13222 connecting the bottom wall 13221 and the annular plate 1321. A second magnetic gap 102 is formed by the hollow protrusion 1322 together with the bottom plate 11 and the second magnet 131. The second voice coil 32 locates in the second magnetic gap 102. The third magnet 133 covers the second through hole 1320. The fourth magnet 134 is fixed to a lower surface of the third magnet 133 and contained inside the hollow protrusion 1322.

Optionally, the third magnet 133 and the fourth magnet 134 are integrated into one piece. a lower surface 13220 of the bottom wall 13221 is flush with a lower surface 111 of the bottom plate 11.

The coaxial speaker 100 further includes a first frame 4 and a second frame 5. The first frame 4 is fixed to the first yoke 122. The second frame 5 is fixed to the lower surface 111 of the bottom plate 11. An outer fixing part 211 of the first diaphragm 21 is fixed to the first frame 4, an inner fixing part 212 of the first diaphragm 21 is fixed to the third magnet 133. The second diaphragm 31 is fixed to the second frame 5.

The first sounding unit 2 further includes an elastic supporting member 23 opposite to and spaced apart from the first diaphragm 21, and a skeleton 24 connected between the first diaphragm 21 and the elastic supporting member 23. An amount of the elastic supporting members 23 is two, the two elastic supporting members 23 are respectively arranged on two opposite short-axis sides of the coaxial speaker 100. The skeleton 24 includes two supporting arms 241 respectively fixed to the two elastic supporting members 23. Each supporting arm 241 is arranged between the first frame 4 and the first magnetic unit 12. An outer fixing portion 2301 of each elastic supporting member 23 is fixed to the first frame 4, an inner fixing portion 2302 of each elastic supporting member 23 is fixed to a corresponding one of the two supporting arms 241. Each elastic supporting member 23 includes a first flexible printed circuit board 231 fixed to a corresponding one of the two supporting arms 241 and an auxiliary diaphragm 232 fixed to a lower surface of the first flexible printed circuit board 231. The first voice coil 22 is electrically connected to an external power supply through the first flexible printed circuit board 231.

The second sounding unit 3 further includes a second flexible printed circuit board 33 fixed to a surface of the second diaphragm 31 close to the magnetic circuit system 1. The second voice coil 32 is electrically connected to an external power supply through the second flexible printed circuit board 33.

The second flexible printed circuit board 33 includes a peripheral part 331 sandwiched between the second diaphragm 31 and the second frame 5, and an extension part 332 extending from the peripheral part 331 toward the first diaphragm 21. An end 3321 of the extension part 332 is fixed to a lower surface 1221 of the first yoke 122. The bottom plate 11 and the first magnet 121 are provided with a depressed region 1211 for avoiding the extension part 332. The extension part 332 extends along sides of the second frame 5, the bottom plate 11 and the first magnet 121.

The second frame 5 is provided with a leakage path 50. The leakage path 50 can keep the air pressure balance between the inside and outside of the second frame 5.

The coaxial speaker 100 further includes a bottom cover 6. The bottom cover 6 covers the second diaphragm 31 and is provided with a sound hole 60 for the second sounding unit 3.

In the coaxial speaker according to the present disclosure, the first magnetic unit and the second magnetic unit are spaced apart for forming the first magnetic gap for the first sounding unit, the second magnetic unit forms the second magnetic gap for the second sounding unit through the hollow protrusion of its second yoke, the first sounding unit and the second sounding unit have the common magnetic circuit system, thereby the coaxial speaker is simple and compact in structure and reduces the cost. In addition, besides the first sounding unit emits low-frequency sounds and the second sounding unit emits high-frequency sounds for providing high quality full-frequency sounds, the second sounding unit can also be used as a receiver, and the first sounding unit serves as a reverse phase silencer when the receiver works.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A coaxial speaker, comprising:

a magnetic circuit system;

a first sounding unit arranged on an upper side of the magnetic circuit system, comprising a first diaphragm and a first voice coil driving the first diaphragm for vibrating and emitting sounds; and a second sounding unit arranged on a lower side of the magnetic circuit system and coaxially with the first sounding unit, comprising a second diaphragm and a second voice coil driving the second diaphragm for vibrating and emitting sounds;

wherein the magnetic circuit system comprises a bottom plate, and a first magnetic unit and a second magnetic unit fixed to the bottom plate, the first magnetic unit is arranged on an outer side of the second magnetic unit and spaced apart from the second magnetic unit for forming a first magnetic gap, the first voice coil locates in the first magnetic gap, the first magnetic unit comprises a first magnet fixed to the bottom plate and a first yoke fixed to the first magnet, the bottom plate is provided with a first through hole, the second magnetic unit comprises a second magnet in an annular shape fixed to the bottom plate and surrounding the first through hole, a second yoke fixed to the second magnet, a third magnet fixed to the second yoke, and a fourth magnet fixed to the third magnet and contained inside the second yoke, the second yoke comprises an annular plate provided with a second through hole and sandwiched between the second magnet and the third magnet, and a hollow protrusion extending from an inner edge of the annular plate in a direction away from the third magnet, the hollow protrusion extends through the second magnet to the first through hole, the hollow protrusion comprises a bottom wall and a side wall connecting the bottom wall and the annular plate, a second magnetic gap is formed by the hollow protrusion together with the bottom plate and the second magnet, the second voice coil locates in the second magnetic gap, the third magnet covers the second through hole, the fourth magnet is fixed to a lower surface of the third magnet and contained inside the hollow protrusion.

2. The coaxial speaker as described in claim 1, wherein the third magnet and the fourth magnet are integrated into one piece.

3. The coaxial speaker as described in claim 1, wherein a lower surface of the bottom wall is flush with that of the bottom plate.

4. The coaxial speaker as described in claim 1, further comprising a first frame and a second frame, wherein the first frame is fixed to the first yoke, the second frame is fixed to a lower surface of the bottom plate, an outer fixing part of the first diaphragm is fixed to the first frame, an inner fixing part of the first diaphragm is fixed to the third magnet, the second diaphragm is fixed to the second frame.

5. The coaxial speaker as described in claim 4, wherein the first sounding unit further comprises an elastic supporting member opposite to and spaced apart from the first diaphragm, and a skeleton connected between the first diaphragm and the elastic supporting member, an amount of the elastic supporting members is two, the two elastic supporting members are respectively arranged on two opposite short-axis sides of the coaxial speaker, the skeleton comprises two supporting arms respectively fixed to the two elastic supporting members, each supporting arm is arranged between the first frame and the first magnetic unit, an outer fixing portion of each elastic supporting member is fixed to the first frame, an inner fixing portion of each elastic supporting member is fixed to a corresponding one of the two supporting arms.

6. The coaxial speaker as described in claim 5, wherein each elastic supporting member comprises a first flexible printed circuit board fixed to a corresponding one of the two supporting arms and an auxiliary diaphragm fixed to a lower surface of the first flexible printed circuit board.

7. The coaxial speaker as described in claim 4, wherein the second sounding unit further comprises a second flexible printed circuit board fixed to a surface of the second diaphragm close to the magnetic circuit system, the second flexible printed circuit board comprises a peripheral part sandwiched between the second diaphragm and the second frame, and an extension part extending from the peripheral part toward the first diaphragm, an end of the extension part is fixed to a lower surface of the first yoke.

8. The coaxial speaker as described in claim 7, wherein the bottom plate and the first magnet are provided with a depressed region for avoiding the extension part, the extension part extends along sides of the second frame, the bottom plate and the first magnet.

9. The coaxial speaker as described in claim 4, wherein the second frame is provided with a leakage path.

10. The coaxial speaker as described in claim 4, further comprising a bottom cover, wherein the bottom cover covers the second diaphragm and is provided with a sound hole for the second sounding unit.

* * * * *